United States Patent Office 3,752,776
Patented Aug. 14, 1973

3,752,776
MULTIMETALITE CATALYSTS
Arthur W. Chester, Hightstown, and George T. Kerr and Howard S. Sherry, Trenton, N.J., and Albert E. Schweizer, Pasadena, Calif., assignors to Mobil Oil Corporation
No Drawing. Filed Nov. 16, 1970, Ser. No. 90,129
Int. Cl. B01j 11/06, 11/22
U.S. Cl. 252—465  6 Claims

ABSTRACT OF THE DISCLOSURE

A new class of inorganic compounds has been prepared in which the cation is a transition metal complex and the anion is a heterpoly ion. These compounds can be represented by the general empirical formula:

$$[ML_N]_{m/n}[M'_xM''_yO_z]$$

where
M=a transition metal or a mixture of a transition metal with hydrogen
N=the number of ligands
$L_N$=a set of N ligands at least one of which functions as a reducing agent
$m$=the charge on the anion
$n$=the charge on the cation
M'=a transition metal or non-metal or hydrogen
M''=a metal selected from the group consisting of Group V–B and VI–B metals
$x$ is 1 or 2
$y$ is between 5 and 20
$z$ is between 20 and 50

Thermal decomposition of the above compounds in an inert atmosphere results in a new series of materials referred to herein as "multimetalities" which have been found to possess unusual catalytic properties.

BACKGROUND OF THE INVENTION

(1) Field of the invention

This invention relates to a new class of inorganic compounds in which the cation is a transition metal complex or a mixture of a transition metal with hydrogen and the anion is a heteropoly ion. These compounds can be thermally decomposed in an inert environment to form a new series of materials known as multimetalites. These multimetalites have the ability to serve as catalysts in a wide range of hydrocarbon conversion reactions. Additionally these multimetalites may be combined with a support, such as alumina, to produce a heterogeneous catalyst.

(2) Description of the prior art

A. Ph. D. thesis by Rollins entitled "Elucidation of Heteropoly Molybdogallates and Tungstogallates, a Crystallizable 6-Isopoly Paratungstate and a New Paramolybdate" describes the preparation of a compound with the following formula:

$$[Co(NH_3)_5H_2O][GaMo_6O_{24}H_6]$$

This dissertation was published in 1966 by University Microfilms Inc., Ann Arbor, Mich. The compound was prepared to illustrate the fact that the anion had a charge of minus three. No attempt was made to thermally decompose the salt or prepare a catalyst therefrom.

U.S. 3,502,506 issued to Broyde describes a material having the formula $M_xWO_y$ where the metal is a transition or post-transition metal, $x$ is a variable between 0 and 1 and $y$ is between 2 and 4. A fundamental difference from the multimetalites described herein is that the materials of Broyde relates to tertiary systems while this invention concerns quaternary systems.

SUMMARY OF THE INVENTION

This invention provides a method for the preparation of a series of new inorganic compounds which can be represented by the following formula:

$$[ML_N]_{m/n}[M'_xM''_yO_z]$$

where
M=a transition metal or a mixture of a transition metal with hydrogen
N=the number of ligands
$L_N$=a set of N ligands at least one of which functions as a reducing agent
$m$=the charge on the anion
$n$=the charge on the cation
M'=a transition metal or non-metal or hydrogen
M''=a metal selected from the group consisting of Group V–B and VI–B metals
$x$ is 1 or 2
$y$ is between 5 and 20
$z$ is between 20 and 50

Thermal decomposition of these compounds produce novel materials which are known as multimetalites and can be represented by the following formula:

$M_{m/n}M'_xM''_yO_w$ where M is derived from the cation of a compound of the above type wherein said cation is hydrogen, or a transition metal or mixture thereof with each other, M' is a metal or a non-metal and M'' is derived from the metal which is represented by M'' in the parent compound and $w$ is a number representing the number of oxygen atoms and is less than $z$ noted hereinbefore. Generally at least two of M, M' and M'' differ from one another. For purposes of illustration the products of the thermal decomposition of the compounds:

$$[Co(NH_3)_6][MMo_6O_{24}H_6]xH_2O$$

where M=Co, Fe, Cr and Al should be written as follows:

$CoCoMo_6O_{19}$
$CoFeMo_6O_{19}$
$CoCrMo_6O_{19}$
$CoAlMo_6O_{19}$

These multimetalites can be used as hydrocarbon conversion catalysts by themselves, in conjunction with supports such as alumina, silica, clay and the like and can also be treated with hydrogen to improve their catalytic capabilities.

DESCRIPTION OF SPECIFIC EMBODIMENTS

The new inorganic compounds of this invention are prepared by the addition of a solution of a soluble salt of the cation in a suitable solvent to a similarly soluble solution of the anion. The order of addition is not critical. The reaction should be carried out under non-alkaline conditions. The reaction mixture may be neutral or acidic. The temperature of the reaction should generally not be above 200° C. in order to preserve the stability of each compound.

The cation of these new inorganic compounds contains a transition metal or a mixture of a transition metal with hydrogen complexed with a dissociable ligand with reducing properties. Examples of preferred transition metals are nickel, chromium, rhodium, iron, cobalt, palladium and platinum. Ammonia is the preferred ligand. Examples of other suitable ligands are alkyl and aryl amines, aromatic amines, phosphines and arsines.

The anion usually contains two metals plus oxygen. M' of the parent salt can be either a transition metal or a non-metal such as phosphorus, boron, tellurium, silicon, or arsenic. M' can also be hydrogen in which case the anion is known as an isopoly anion. M" can be selected from Group V-B and VI-B metals which include tungsten, molybdenum, chromium, vanadium, niobium and tantalum.

"Treatise on Inorganic Chemistry" by Remy, Anderson, and Kleinberg, Elsevior Publishing Company, 1956, states on pages XXVI and XXVII that "The elements in which 'inner shells' are being elaborated (i.e., in which $d$ and $f$ levels are being filled up) are known collectively as transition elements."

The resulting compounds can be thermally decomposed at temperatures from about 300° C. to about 900° C. with a preferred range of 400° C. to 700° C. to produce a new series of materials known as multimetalites. The thermal decomposition is carried out in an inert atmosphere such as nitrogen, helium, or argon. Thermal decomposition can also be achieved by heating the parent salt in a high vacuum system.

A preferred preparation of the parent compound consists of mixing highly charged cations and anions whose charges are a simple multiple of one another. By way of illustration, a heteropoly anion with a $-6$ charge will form an insoluble salt when mixed with a cation that has a charge of $+2$, $+3$, or $+6$. The advantages of this preferred procedure is that the insoluble compound forms in a well defined stoichiometric form, and is easily removed from the supernatant liquid, allowing recovery of the parent compound of this invention in pure form. Illustrative of a preferred salt is $[M(NH_3)_4]_3[CoW_{12}O_{40}]xH_2O$ where M can be platinum or palladium.

The thermal decomposition products of these parent salts can be used to catalyze a wide variety of hydrocarbon conversion reactions, such as hydrogenation, dehydrogenation, isomerization, hydrogenolysis, combustion of carbon monoxide, decomposition of nitric oxide, cracking and hydrocracking of hydrocarbons, reforming, aromatization, dehydrocyclization, alkylation, hydrodesulfurization, denitrogenation, disproportionation, carbonylation, hydroformylation, polymerization and nitrogen fixation.

The combustion of carbon monoxide and the decomposition of nitric oxide are becoming increasingly important reactions in light of the effort being made to clean up the exhaust gases of internal combustion engines. As is well known, these exhaust gases contain considerable quantities of toxic and obnoxious fumes. For example, exhaust gases may contain unburned or partially burned hydrocarbons, carbon monoxide and nitrogen oxides. Amounts as small as 0.1 volume percent of carbon monoxide in the atmosphere are dangerous and lethal amounts can be inhaled and combined with blood hemoglobin before its effects become evident. Nitrogen oxides react with olefinic hydrocarbons in the presence of sunlight to produce pollutants that have an offensive odor, are irritating to the mucous membranes and cause damage to certain species of plants.

Hydrogenation in the presence of the catalyst described herein generally takes place at about 0.1 to about 10 LHSV at about 50 to about 1000° F., at about 15 to about 4000 p.s.i.a. pressure and about 1 to about 100 molar ratio of hydrogen to hydrocarbon. Such conditions are referred to as "hydrogenation conditions." Preferably the hydrogenation conditions lie in the following ranges: about 1 to about 5 LHSV, about 100 to about 600° F., about 15 to about 1500 p.s.i.a. pressure and about 10 to about 50 molar ratio of hydrogen to hydrocarbon.

Dehydrogenation in the presence of the catalyst described herein generally takes place at about 0.1 to about 20 LHSV, at about 350 to about 1250° F., at about 0 to about 750 p.s.i.a. pressure and about 0 to about 20 molar ratio of hydrogen to hydrocarbon. Such conditions are referred to as "dehydrogenation conditions." Preferably the dehydrogenation conditions lie in the following ranges: about 1 to about 10 LHSV, about 700 to about 1100° F., about 0 to about 50 p.s.i.a. pressure for diolefins and about 10 to about 100 p.s.i.a. pressure for other hydrocarbons and about 1 to about 10 molar ratio of hydrogen to hydrocarbon.

Dehydrocyclization in the presence of the catalyst described herein generally takes place at about 0.1 to about 20 LHSV at about 350 to about 1250° F., at about 0 to about 500 p.s.i.a. pressure and about 0 to about 20 molar ratio of hydrogen to hydrocarbon. Such conditions are referred to as dehydrocyclization conditions. Preferably the dehydrocyclization conditions lie in the following ranges: about 1 to about 5 LHSV, about 825 to about 1050° F., about 15 to about 150 p.s.i.a. pressure and about 1 to about 5 molar ratio of hydrogen to hydrocarbon.

Hydrodesulfurization in the presence of the catalyst described herein generally takes place at about 0.5 to about 20 LHSV, about 500 to about 1200° F., about 0 to about 1500 p.s.i.a. pressure and about 1 to about 20 molar ratio of hydrogen to hydrocarbon. Such conditions are referred to as "hydrodesulfurization conditions." Preferably the hydrodesulfurization conditions lie in the following ranges: about 1 to about 10 LHSV, about 600 to about 1000° F., about 50 to about 1000 p.s.i.a. pressure and about 2–10 molar ratio of hydrogen to hydrocarbon.

Hydrocracking in the presence of the catalyst described herein generally takes place at about 0.1 to about 10 LHSV, about 400 to about 1000° F., about 100 to about 3000 p.s.i.a. pressure and about 2 to about 80 molar ratio of hydrogen to hydrocarbon. Such conditions are referred to as "hydrocracking conditions." Preferably the hydrocracking conditions lie in the following ranges: about 0.5 to about 5 LHSV, about 500 to about 900° F., about 350 to 2000 p.s.i.a. pressure and about 5 to about 50 molar ratio of hydrogen to hydrocarbon.

Reforming in the presence of the catalyst described herein generally takes place at about 0.5 to about 20 LHSV, about 750 to about 1050° F., at about 15 to about 750 p.s.i.a. pressure and about 1 to about 20 molar ratio of hydrogen to hydrocarbon. Such conditions are referred to as "reforming conditions." Preferably the reforming conditions lie in the following ranges: about 1 to about 10 LHSV, about 825 to about 1000° F., about 50 to about 500 p.s.i.a. pressure and about 2 to about 10 molar ratio of hydrogen to hydrocarbon.

These multimetalites may be used as or incorporated into fuel cell electrodes.

Additionally, the multimetalites so formed generally occur as highly colored microcrystalline powders and are useful as paint pigments.

Although not wishing to be bound by any theory, it is believed that during the thermal solid state transformation of the parent compound to the multimetalite, the oxidizable ligand serves to reduce the metal in the cation of the parent compound to a lower oxidation state. It is also believed that the anion metals may have their oxidation state altered via interaction with the ligand.

The multimetalites so obtained may be combined with supports such as alumina, silica, porous carbon, clay and the like to improve their catalytic capability. Additionally it has been shown that treatment of the multimetalites with a reducing atmosphere such as hydrogen, carbon monoxide, ammonia and the like before use as a catalyst improves the multimetalites' performance as a catalyst.

The following examples will illustrate the preparation of these new inorganic compounds, their thermal decomposition products, and the use of these products, known as multimetalites, as catalysts.

Examples 1–17 illustrate the preparation of the parent compound.

Analysis of the parent salts and the multimetalites obtained therefrom were conducted on a Du Pont thermogravimetric analyzer. The salts or multimetalites were reduced to their respective metals with hydrogen by heating at a temperature about 1000–1200° C. From the known metal ratios, the formula of the salt or multimetalite was obtained. The ammonia content was determined by base distillation, followed by titration of the liberated ammonia.

EXAMPLE 1

A solution of 13 g. ammonium 6-molybdocobaltate (III) in 350 ml. water was added to a solution of 3 g. $Co(NH_3)_6Cl_3$ in 100 ml. water. The precipitate was filtered, washed with alcohol and air dried. The yield was 12.4 g. of hexamminecobalt (III) 6-molybdocobaltate (III) which has the formula of $$[Co(NH_3)_6][CoMo_6O_{24}H_6]\cdot 8H_2O$$

EXAMPLE 2

A solution of 11.7 g. ammonium 6-molybdoferrate (III) in 300 ml. water was added to a solution of 3 g. $Co(NH_3)_6Cl_3$ in 100 ml. water. The precipitate was filtered, washed with alcohol, and air dried. The yield was 12.3 g. of hexamminecobalt (III) 6-molybdoferrate (III) which has the formula of $$[Co(NH_3)_6][FeMo_6O_{24}H_6]\cdot 14H_2O$$

EXAMPLE 3

A solution of 11.5 g. ammonium 6-molybdochromate (III) in 300 ml. water was added to a solution of 3 g. $Co(NH_3)_6Cl_3$ in 100 ml. water. The precipitate was filtered, washed with alcohol, and air dried. The yield was 12.6 g. of hexamminecobalt (III) 6-molybdochromate (III) which has the formula of $$[Co(NH_3)_6][CrMo_6O_{24}H_6]\cdot 6H_2O$$

EXAMPLE 4

A solution of 11.4 g. ammonium 6-molybdoaluminate (III) in 350 ml. water was added to a solution of 3 g. $Co(NH_3)_6Cl_3$ in 100 ml. water. The precipitate was filtered through a Millipore filter, washed with alcohol, and air dried. The yield was 12.2 g. of hexamminecobalt (III) 6-molybdoaluminate (III) which has the formula of $[Co(NH_3)_6][AlMo_6O_{24}H_6]\cdot 6H_2O$.

EXAMPLE 5

A solution of 9 g. ammonium 10-molybdodicobaltate (III) in 300 ml. water was added to a solution of 3 g. $Co(NH_3)_6Cl_3$ in 100 ml. water. The precipitate was filtered, washed with alcohol, and air dried. The yield was 10.2 g. of hexamminecobalt (III) 10-molybdodicobaltate (III) which has the formula of $$[Co(NH_3)_6]_2[Co_2Mo_{10}O_{36}]\cdot 13H_2O$$

EXAMPLE 6

A solution of 8.3 g. ammonium 9-molybdonickelate (IV) in 300 ml. water was added to a solution of 3 g. $Co(NH_3)_6Cl_3$ in 100 ml. water. The precipitate was filtered, washed with ethanol, and air dried. The yield was 9.3 g. of hexamminecobalt (III) 9-molybdonickelate (IV) which has the formula of $$[Co(NH_3)_6]_2[NiMo_9O_{32}]\cdot 6H_2O$$

EXAMPLE 7

A solution of 5.3 g. $[Pt(NH_3)_4]Cl_2\cdot H_2O$ in 50 ml. water was added to a solution of 9.0 g. ammonium 10-molybdodicobaltate (III) in 300 ml. hot water. The precipitate was filtered, washed with alcohol, and air dried. The product was tetrammineplatinum (II) 10-molybdodicobaltate (III) which has the formula of $$[Pt(NH_3)_4]_3[Co_2Mo_{10}O_{36}]\cdot 11H_2O$$

EXAMPLE 8

A solution of 5.3 g. $[Pt(NH_3)_4]Cl_2\cdot H_2O$ in 50 ml. water was added to a solution of 8.3 ammonium 9-molybdonickelate (IV) in 400 ml. water. The precipitate was tetrammineplatinum (II) 9-molybdonickelate (IV) which has the formula of $$[Pt(NH_3)_4]_3[NiMo_9O_{32}]\cdot 12H_2O$$

EXAMPLE 9

A solution of 0.68 g. $Cr(NH_3)_6(NO_3)_3$ in 40 ml. water was added to a solution of 2.3 g. ammonium 6-molybdochromate in 150 ml. water. The rose-colored precipitate was filtered, washed with alcohol, and air dried. The yield was 2.38 g. of hexamminechromium (III) 6-molybdochromate (III) which has the formula of $$[Cr(NH_3)_6][CoMo_6O_{24}H_6]\cdot 3H_2O$$

EXAMPLE 10

A solution of 0.68 g. $Cr(NH_3)_6(NO_3)_3$ in 40 ml. water was added to a solution of 2.41 g. ammonium 6-molybdocobaltate (III) in 100 ml. water. The light green precipitate was filtered, washed with alcohol, and air dried. The yield was 2.55 g. of hexamminechromium (III) 6-molybdocobaltate (III) which has the formula of $[Cr(NH_3)_6][CoMo_6O_{24}H_6]\cdot 3H_2O$.

EXAMPLE 11

A solution of 100 g. $K_5H[CoW_{12}O_{40}]\cdot 19H_2O$ in 150 ml. water containing 0.5 ml. concentrated hydrochloric acid was added to a warm solution of 16 g. $Co(NH_3)_6Cl_3$ in 300 ml. water. The green precipitate was filtered, washed with water and alcohol and air dried. The yield was 89.6 g. of hexamminecobalt (III) 12-tungstocobaltate (II) which has the formula of $$[Co(NH_3)_6]_2[CoW_{12}O_{40}]\cdot 5H_2O$$

EXAMPLE 12

A solution of 1.0 g. $Cr(NH_3)_6(NO_3)_3$ in 75 ml. water was added to a solution of 5.0 g. $K_5H[CoW_{12}O_{40}]\cdot 19H_2O$ in 50 ml. water. The light green precipitate was filtered, washed with water and alcohol, and air dried. The yield was 4.5 g. of hexamminechromium (III) 12-tungstocobaltate (II) which has the formula of $$[Cr(NH_3)_6]_2[CoW_{12}O_{40})]\cdot 11H_2O$$

EXAMPLE 13

A solution of 10.5 g. $K_5H[CoW_{12}O_{40}]\cdot 19H_2O$ in 250 ml. water containing concentrated hydrochloric acid was added to a solution of 1.0 g. $[Pt(NH_3)_4]Cl_2\cdot H_2O$ in 250 ml. water. The light blue precipitate was filtered, washed with alcohol, and air dried. The product was tetrammineplatinum (II) 12-tungstocobaltate (II) which has the formula of $[Pt(NH_3)_4]_3[CoW_{12}O_{40}]\cdot 9H_2O$.

EXAMPLE 14

The procedure for Example 13 was repeated except 1 g. of $[Pd(NH_3)_4]Cl_2$ was employed instead of the corresponding platinum salt. The yield was 5.1 g. of tetramminepalladium (II) 12-tungstocobaltate (II) which has the formula of $[Pd(NH_3)_4]_3[CoW_{12}O_{40}]\cdot 7H_2O$.

EXAMPLE 15

A solution of 1 g. of $[Cu(NH_3)_4]SO_4\cdot H_2O$ in 100 ml. water was mixed with a solution of 14 g. of $$K_5H[CoW_{12}O_{40}]\cdot 19H_2O$$

The solid was filtered, washed with alcohol, and air dried. The yield is 1.6 g. of $$[Cu(NH_3)_n(H_2O)_{4-n}]_3[CoW_{12}O_{40}]\cdot xH_2O$$

where $n$ is about 3 and $x$ is about 12.

EXAMPLE 16

To a solution of 14 g. $K_5H[CoW_{12}O_{40}]\cdot 19H_2O$ in 150 ml. water was added 1 g. solid $Ni(NH_3)_6Cl_2$. After stirring several minutes, the solid was filtered, washed with alcohol, and air dried. The yield was 1.55 g. of

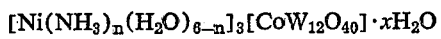

where $n$ is about 3 and $x$ about 3.

EXAMPLE 17

One gram of

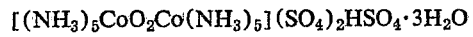

was dissolved in 1 liter of 1 M sulfuric acid at 60–70° C. A solution of 6.0 g. $K_5[CoW_{12}O_{40}] \cdot 20H_2O$ in 250 ml. water was added slowly, maintaining the temperature of the mixture at 60–70° C. After cooling to room temperature, the precipitate was filtered, washed with alcohol, and air dried. The product is $\mu$-superoxodecamminedicobalt (III) 12-tungsocobaltate (III) which has the formula of $[(NH_3)_5CoO_2Co(NH_3)_5][CoW_{12}O_{40}] \cdot 5H_2O$.

Table 1 illustrates the multimetalite products obtained by thermal decomposition of the parent compounds described in Examples 1–17. Table 1 also illustrates in Examples 36–42 the multimetalite products obtained by thermal decomposition of a suitable compound type where the cation is ammonium. The multimetalite products are obtained by thermal decomposition in an inert atmosphere or in a high vacuum. The various methods for this decomposition are as follows:

(A) Thermal decomposition in Du Pont thermogravimetric analyzer to indicated temperatures under helium flow by heating at 20° C./min.
(B) Thermal decomposition in tube furnace under helium by heating to indicated temperature.
(C) Heating rapidly in high vacuum system to indicated temperature in a quartz reactor.
(D) Heating in a high vacuum system at 6–7°/min. to indicated temperature in a quartz reactor.

The four methods give equivalent results. The method employed for decomposition is indicated by the appropriate letter in Table 1 under the method column.

TABLE 1
Examples 18-42

| Parent compound | Method | Multimetalite |
|---|---|---|
| $[Co(NH_3)_6][CoMo_6O_{24}H_6] \cdot 8H_2O$ | C (600°) | $CoCoMo_6O_{19}$ |
| $[Co(NH_3)_6][FeMo_6O_{24}H_6] \cdot 14H_2O$ | C (600°) | $CoFeMo_6O_{19}$ |
| $[Co(NH_3)_6][CrMo_6O_{24}H_6] \cdot 6H_2O$ | C (600°) | $CoCrMo_6O_{19}$ |
| $[Co(NH_3)_6][AlMo_6O_{24}H_6] \cdot 6H_2O$ | C (600°) | $CoAlMo_6O_{19}$ |
| $[Co(NH_3)_6]_2[Co_2Mo_{10}O_{36}] \cdot 13H_2O$ | C (600°) | $Co_2Co_2Mo_{10}O_{33}$ |
| $[Co(NH_3)_6]_2[NiMo_9O_{32}] \cdot 6H_2O$ | C (600°) | $Co_2NiMo_9O_{28}$ |
| $[Pt(NH_3)_4]_3[Co_3Mo_{10}O_{36}] \cdot 11H_2O$ | A (500°) | $Pt_3Co_2Mo_{10}O_{21}$ |
| $[Pt(NH_3)_4]_3[NiMo_9O_{32}] \cdot 12H_2O$ | A (500°) | $Pt_3NiMo_9O_{19}$ |
| $[Cr(NH_3)_6][CrMo_6O_{24}H_6] \cdot 3H_2O$ | A (320°) | $CrCrMo_9O_{19}$ |
| $[Cr(NH_3)_6][CoMo_6O_{24}H_6] \cdot 3H_2O$ | A (600°) | $CrCoMo_6O_{19}$ |
| $[Co(NH_3)_6]_2[CoW_{12}O_{40}] \cdot 5H_2O$ | C (900°) | $Co_2CoW_{12}O_{37}$ |
| $[Pt(NH_3)_4]_3[CoW_{12}O_{40}] \cdot 9H_2O$ | B,C (700°) | $Pt_3CoW_{12}O_{35}$ |
| $[Pt(NH_3)_4]_3[CoW_{12}O_{40}] \cdot 9H_2O$ | D (700°) | $Pt_3CoW_{12}O_{35}$ |
| $[Pd(NH_3)_4]_3[CoW_{12}O_{40}] \cdot 7H_2O$ | C (800°) | $Pd_3CoW_{12}O_{35}$ |
| $[Cu(NH_3)_3(H_2O)]_3[CoW_{12}O_{40}] \cdot nH_2O$ | C (650°) | $Cu_3CoW_{12}O_{35}$ |
| $[Ni(NH_3)_3(H_2O)]_3[CoW_{12}O_{40}] \cdot nH_2O$ | C (800°) | $Ni_3CoW_{12}O_{38}$ |
| $[Cr(NH_3)_6]_2[CoW_{12}O_{40}] \cdot 11H_2O$ | A (850°) | $Cr_2CoW_{12}O_{37}$ |
| $[(NH_3)_5CoO_2Co(NH_3)_5][CoW_{12}O_{40}] \cdot 5H_2O$ | A (650°) | $Co_2CoW_{12}O_{37}$ |
| $(NH_4)_3[CoMo_6O_{24}H_6] \cdot nH_2O$ | A, D (500°) | $H_xCoMo_6O_{18}$ |
| $(NH_4)_3[RhMo_6O_{24}H_6] \cdot nH_2O$ | D (500°) | $H_xRhMo_6O_{19}$ |
| $(NH_4)_4[NiMo_9O_{32}] \cdot nH_2O$ | D (500°) | $H_xNiMo_9O_{27}$ |
| $(NH_4)_3[FeMo_6O_{24}H_6] \cdot nH_2O$ | D (500°) | $H_xFeMo_6O_{18}$ |
| $(NH_4)_3[CrMo_6O_{24}H_6] \cdot nH_2O$ | D (500°) | $H_xCrMo_6O_{18}$ |
| $(NH_4)_3[AlMo_6O_{24}H_6] \cdot nH_2O$ | D (500°) | $H_xAlMo_6O_{18}$ |
| $(NH_4)_6[Co_2Mo_{10}O_{36}] \cdot nH_2O$ | D (500°) | $H_xCo_2Mo_{10}O_{30}$ |

EXAMPLE 43

Hydrated alumina was prepared from 8.7 g. pure aluminum turnings, 100 ml. boiling water and 0.1 g. mercuric chloride. The slurry was boiled and a hot solution of 3.6 g. ammonium 6-molybdocobaltate (III) in 80 ml. hot water was added dropwise with stirring. The volume of the mixture was reduced to 300 ml. by boiling and the remaining water removed under a heat lamp. The entire solid was heated to 550° at 6–7°/min. in a high vacuum system and held at 550° for 30 minutes. The product is the multimetalite $H_xCoMo_6O_{18}$ on $\gamma$-alumina.

EXAMPLE 44

A complex transition metal salt with a formula $[Co^{III}(NH_3)_6]_2[Co^{II}O_4W_{12}O_{36}]$ was thermally decomposed in a helium stream to form the product multimetalite $Co_2CoW_{12}O_{37}$. A 0.2 ml. aliquot of this material was evaluated, using a microcatalytic apparatus and technique described by P. B. Weisz and J. N. Miale in J. Catalysis, 4, 527 (1965). The multimetalite was treated at 800° F. in a hydrogen stream flowing at 20 ml./minute for four hours. It was then tested for hydrogenation of propylene in an increasing temperature experiment at 200–400° F. and 1 atmosphere, charging propylene diluted with four parts hydrogen at a vapor hourly space velocity of 3000 (volumes per hour per volume of catalyst). Samples of the product effluent were analyzed by vapor phase chromatography. Maximum conversion to propane was 0.44%.

EXAMPLE 45

The used multimetalite from Example 44 was treated with hydrogen for an additional four hours at 900° F. It was tested for propylene hydrogenation as in Example 44. Conversion at 400° F. was 1.1%; at 500° F., it was 10% after two hours on stream time.

EXAMPLE 46

The used multimetalite catalyst from Example 45 was treated with hydrogen for four hours at 1000° F. It was used for cyclohexane dehydrogenation for 2½ hours and then cooled in helium. After confinement in helium overnight, the catalyst was heated under helium flow to 500° F. Conversion of propylene to propane was resumed without further pretreatment. After 6½ hours on stream under the same conditions as Examples 44 and 45, conversion was 90.5% to propane, the only product formed.

Examples 44–46 demonstrate the criticality of the hydrogen pretreatment temperature.

EXAMPLE 47

A complex transition metal compound of the formula $[Pt(NH_3)_4]_3[Co^{II}O_4W_{12}O_{36}]$ was thermally decomposed in a stream of helium to form the multimetalite $Pt_3CoW_{12}O_{35}$. A 0.2 ml. aliquot of the product was loaded into a microcatalytic reactor as in Example 44 and treated with hydrogen as in Example 46. The product was used for cyclohexane dehydrogenation (Example 48) and then sealed in helium overnight at room temperature. It was then treated with hydrogen for two hours at 800° F. and cooled in helium to 435° F. where it was used for hydrogenation of propylene at 3000 VHSV as in Examples 44–46. Conversion to propane was 88.5% at 435° F. and 91.6% at 500° F. and 43 minutes on stream. The hydrocarbon products also included 0.3 wt. percent $C_6$ (dimers).

Examples 48–53 illustrate that multimetalites derived from complex transition metal ammine heteropolytungstates have high selectivity for converting cyclohexane to benzene as opposed to simple tungsten compounds. Results are shown in Table 2.

EXAMPLE 48

The platinum multimetalite aliquot of Example 47 was tested for cyclohexane dehydrogenation after a four-hour hydrogen pretreat at 1000° F. using a cyclohexane-saturated hydrogen stream at 1.77 liquid hourly space velocity, 1 atmosphere, $6.76H_2:C_6H_{12}$ mole ratio, 800–1000° F.

EXAMPLE 49

A 0.2 ml. aliquot of cobalt multimetalite prepared for Example 44 was treated with hydrogen for four hours at 1000° F. It was then tested for conversion of cyclohexane to benzene at 800–900° F. and 1.77 LHSV as in Example 48.

EXAMPLE 50

A 0.2 ml. sample of $Pd_3CoW_{12}O_{35}$ was treated with hydrogen for four hours at 1000° F. It was then used for cyclohexane conversion at 1000° F., other conditions as in Example 48.

EXAMPLE 51

A sample of tungstic oxide was prepared by calcining $H_2WO_4$, tungstic acid overnight at 1000° F. A 1.0 ml. aliquot of this material was treated in flowing hydrogen for four hours at 1000° F. It was then tested for cyclohexane dehydrogenation as in Example 48 except that the liquid hourly space velocity was 0.35. This example illustrates that the ternary material ($H_xWO_3$) resulting from the above hydrogen pretreatment was considerably less active than the multimetalites of Examples 48 and 49 and therefore could not account for the activity found in those catalysts.

EXAMPLE 52

A 1 ml. sample of sodium tungstate (Merck reagent grade $Na_2WO_4 \cdot 2H_2O$) was treated with hydrogen at 1000° F. for four hours. It was then tested for cyclohexane conversion as in Example 51. There was no conversion, indicating that this reaction is not catalyzed by all tungstates.

EXAMPLE 53

A ternary material was prepared by taking 1 ml. of a 5/1 (molar) mixture of $WO_3$ and $Na_2WO_4 \cdot 2H_2O$ and treating with hydrogen for four hours at 1000° F. It was tested for cyclohexane conversion at 800–1000° F. at 0.35 LHSV as in Example 43. Conversion was lower than that found in Example 51 indicating that no enhancement of activity could be achieved.

EXAMPLE 56

A 0.2 ml. aliquot of a multimetalite having the formula $Co_2Co_2Mo_{10}O_{33}$ was hydrogen-treated and tested for cyclohexane dehydrogenation as in Example 55.

EXAMPLE 57

A 0.2 ml. aliquot of multimetalite having the formula $CoCoMo_6O_{19}$ was hydrogen-treated and tested for cyclohexane conversion as in Example 55.

EXAMPLE 58

A 0.2 ml. aliquot of multimetalite having the Formula $CoFeMo_6O_{19}$ was hydrogen-treated and tested for cyclohexane conversion as in Example 55.

EXAMPLE 59

A 0.2 ml. aliquot of multimetalite having the Formula $Co_2NiMo_9O_{28}$ was hydrogen-treated and tested for cyclohexane dehydrogenation as in Example 55.

EXAMPLE 60

A 0.2 ml. aliquot of commercial potassium-promoted chromina alumina catalyst was hydrogen-treated and tested for cyclohexane conversion as in Examples 54–59. There was no conversion below 850° F. Benzene yield ranged from 1.02% at 870° F. to 34.9% at 1000° F. with selectivity >98%.

EXAMPLE 61

A 0.2 ml. aliquot of a commercial reforming catalyst of 0.6% Pt on $\eta$-$Al_2O_3$ was also hydrogen-treated and tested as in Examples 54–60, but starting the temperature sequence at 550° F. Conversion rose rapidly from 69.2%

TABLE 2

| Example | Catalyst | Reaction temp., °F. | Weight percent [1] Conversion, A | Weight percent [1] Benzene, B | Selectivity, B/A |
|---|---|---|---|---|---|
| 48 | $Pt_3CoW_{12}O_{35}$ | 800 | 12–18.5 | 10–17 | 75–93 |
|  |  | 850 | 29.7–36.4 | 27–34 | 92–94 |
|  |  | 900 | 59–66 | 54–63 | 92–95 |
|  |  | 950 | 95 | 82 | 87 |
|  |  | 1,000 | 99–98 | 75–76 | 77 |
| 49 | $Co_2CoW_{12}O_{37}$ | 800 | 37–42 | 28–36 | 75–78 |
|  |  | 850 | 51–59 | 37–46 | 74–77 |
|  |  | 900 | 96–99 | 62–63 | 62–67 |
| 50 | $Pd_3CoW_{12}O_{35}$ | 700 | 1.8 | 1.3 | 72 |
|  |  | 811 | 5.3 | 4.9 | 92.5 |
|  |  | 913 | 14.2 | 12.1 | 85.2 |
|  |  | 1,000 | 26.1 | 23.4 | 89.7 |
| 51 | $H_nWO_3$ | 800 | 7–12 | 3.1–4.3 | 35–44 |
|  |  | 900 | 11–15 | 6.3–6.7 | 52–55 |
|  |  | 1,000 | 12.5–10.5 | [2] 7.6–6.7 | 61–64 |
| 52 | $(Na_2WO_4 \cdot 2 H_2O)$ | 800–1,000 | 0 | 0 | 0 |
| 53 | $Na_2WO_4/WO_3$ | 800 | 0 | 0 | 0 |
|  |  | 900 | 1.9–2.1 | 1.7–1.9 | 90 |
|  |  | 1,000 | 6.5–6.6 | 6 | 92 |

[1] Range for all samples analyzed.
[2] Aging.

Examples 54–63 illustrate that multimetalites derived from complex transition metal ammine heteropolymolybdates have good activity and selectivity for converting cyclohexane to benzene. For comparative purposes three commercial dehydrogenation catalysts were tested. The results are shown in Table 3.

EXAMPLE 54

A 0.2 ml. aliquot of a batch of multimetalite having the formula $CoCrMo_6O_{19}$ was treated with hydrogen for four hours at 1000° F. as in Example 47. It was then used for cyclohexane dehydrogenation under conditions of Example 48 but at 600–950° F.

EXAMPLE 55

A 0.2 ml. aliquot of multimetalite having the formula $CoAlMo_6O_{19}$ was treated and tested for cyclohexane dehydrogenation as in Example 48 but at 600–1000° F.

at 550° F. to near completion at 700 F. with only trace amounts of cracked products.

EXAMPLE 62

A 0.2 ml. aliquot of commercial cobalt molybdena alumina (160 m.$^2$/g.) was hydrogen-treated and tested for cyclohexane dehydrogenation as in Examples 54–61 but only at 1000° F.

EXAMPLE 63

A 0.2 ml. aliquot of commercial molybdena alumina (having a surface area of 135 m.$^2$/g.) was tested for cyclohexane dehydrogenation as in Examples 54–62.

Examples 54–63 indicate that the activity and selectivity of the multimetalites is about midway between the activity of commercial supported oxide catalysts and the expensive platinum on alumina.

TABLE 3

| Example | Catalyst | Temperature, °F. | Weight percent A, conversion | Weight percent B, benzene | Selectivity, B/A |
|---|---|---|---|---|---|
| 54 | CoCrMo₆O₁₉ | 604 | 7.1 | 7.0 | 98.6 |
|  |  | 668 | 10.3 | 9.8 | 95.1 |
|  |  | 770 | 40.3 | 38.4 | 95.3 |
|  |  | 860 | 88.3 | 85.3 | 96.6 |
|  |  | 950 | 99.5 | 90.8 | 91.3 |
| 55 | CoAlMo₆O₁₉ | 617 | 4.3 | 3.9 | 90.7 |
|  |  | 750 | 20.8 | 18.3 | 88.0 |
|  |  | 812 | 56.3 | 52.9 | 94.0 |
|  |  | 895 | 88 | 83.7 | 95.1 |
|  |  | 1,000 | 100 | 94.9 | 94.9 |
| 56 | Co₂Co₂Mo₁₀O₂₃ | 628 | 12.1 | 11.2 | 92.6 |
|  |  | 733 | 28.3 | 24.5 | 86.6 |
|  |  | 863 | 95.5 | 87.0 | 91.1 |
|  |  | 1,000 | 95.4 | 95.4 | 95.4 |
| 57 | CoCoMo₆O₁₉ | 614 | 4.1 | 3.7 | 90.0 |
|  |  | 733 | 16 | 14.4 | 90.0 |
|  |  | 871 | 72.4 | 65.3 | 90.2 |
|  |  | 1,000 | 98.7 | 93.6 | 94.8 |
| 58 | CoFeMo₆O₁₉ | 675 | 1.7 | 1.7 | 100 |
|  |  | 875 | 83.1 | 80.7 | 97 |
|  |  | 1,000 | 99.5 | 90.5 | 91 |
| 59 | Co₂NiMo₉O₂₈ | 600 | 11.4 | 10 | 87.7 |
|  |  | 807 | 12.2 | 10.4 | 85.2 |
|  |  | 892 | 100 | 80.2 | 80.2 |
|  |  | 1,010 | 100 | ¹ 79.1 | 79.1 |
| 60 | Cr₂O₃/Al₂O₃ | <850 | 0 | 0 | 0 |
|  |  | 870 | 1.02 | 1.02 | ~100 |
|  |  | 1,000 | 35.2 | 34.9 | >98 |
| 61 | Pt/Al₂O₃ | 550 | 69.2 | 69.2 | 100 |
|  |  | 710 | 99.7 | 99.7 | 100 |
| 62 | CoO/Mo-₃/Al₂O₃ | 1,000 | 76.5 | 61.7 | 78 |
| 63 | MoO₃/Al₂O₃ | ² 1,000 | 57.0 | 23.1 | 38 |
|  |  | ³ 1,000 | 10.6 | 9.5 | 78 |

¹ Aging.
² 5 minutes.
³ 60 minutes.

EXAMPLE 64

A platinum multimetalite of the composition used for Examples 47 and 48 was prereduced in hydrogen as the final step in catalyst preparation and was not pretreated with hydrogen in the catalytic reactor. A 0.2 ml. aliquot of this product was heated in helium to 900° F. and tested for cyclohexane conversion at 900° F., 1.77 LHSV, 1 atmosphere, 6.75H₂:cyclohexane (mole ratio). Results are shown in Table 4:

TABLE 4

| Time on stream | Weight percent A, conversion | B, benzene | Selectivity, B/A |
|---|---|---|---|
| 8 | 87.3 | 80.5 | 92.2 |
| 25 | 90.3 | 83.7 | 92.7 |
| 64 | ¹ 75.4 | 71.6 | 95 |
| 116 | ¹ 59.3 | 56.9 | 96 |
| 225 | 46.1 | 45.1 | 97.8 |
| 376 | ¹ 48.7 | 47.7 | 98 |
| 390 | ¹ 42.5 | 42.3 | 99+ |

¹ Estimated value—VPC problem.

This example demonstrates that hydrogen treatment of the multimetalite could be accomplished as part of catalyst manufacture.

Examples 65–68 demonstrate that dual functional catalysts can be prepared by blending an acidic oxide with a multimetalite. These blends have both dehydrogenation and cracking catalytic capabilities. Results are compared to those for commercial dual functional catalysts in Table 5 and show that with proper blending a superior multimetalite catalyst can be prepared.

EXAMPLE 65

A blend was made by mixing equal weights of

CoCoMo₆O₁₉ and commercial chi alumina. A 0.4 ml. aliquot (enough to have 0.2 ml. CoCoMo₆O₁₉) was hydrogen-treated and tested for cyclohexane conversion as in Example 62.

EXAMPLE 66

A blend was prepared as in Example 65 but using 20 parts CoCoMo₆O₁₉ and 80 parts (by weight) commercial chi alumina. A 1.01 gram aliquot (0.2 ml. CoCoMo₆O₁₉) was tested for cyclohexane conversion as in Example 62.

EXAMPLE 67

A blend was made as in Example 65, but using 46AI silica alumina cracking catalyst as the diluent (acid component). The blend was mixed further by grinding in a mortar. A 0.4 g. aliquot (0.2 ml. CoCoMo₆O₁₉) was tested for cyclohexane conversion as in Example 62.

EXAMPLE 68

A blend was made as in Example 65 but using a commercial silica gel as the diluent. A 0.4 g.

(0.2 ml. CoCoMo₆O₁₉)

was tested for cyclohexane conversion as in Example 62.

TABLE 5

| Example | Catalyst | °F. | Time on stream, minutes | Weight percent A, conversion | B, benzene | Selectivity, B/A |
|---|---|---|---|---|---|---|
| 62 | CoO/MoO₃/Al₂O₃ ᵃ | 1,000 | 30 | 76.5 | 61.7 | 78 |
| 63 | MoO₃/Al₂O₃ ᵃ | 1,000 | 5 | 57.0 | 23.1 | 38 |
|  |  |  | 60 | 10.6 | 9.5 | 78 |
| 65 | 1:1 CoCoMo₆O₁₉/Al₂O₃ | 1,000 | 64 | 98.5 | 1.3 | 92.7 |
| 66 | 1:4 CoCoMo₆O₁₉/Al₂O₃ | 1,000 | 75 | 100 | ᵇ57.5 | 57.5 |
| 67 | 1:1 CoCoMo₆O₁₉/SiO₂/Al₂O₃ | 1,000 | 5 | 100 | ᵇ57.1 | 57.1 |
| 68 | 1:1 CoCoMo₆O₁₉/SiO₂ | 1,000 | 60 | 100 | ᵇ66.9 | 66.9 |

ᵃ Commercial catalyst.
ᵇ Not optimum, benzene yield and selectivity were still increasing when run was stopped.

Examples 69–74 illustrate the use of multimetalites for propane dehydrogenation.

EXAMPLE 69

A 0.1 ml. aliquot of the $Pt_3CoW_{12}O_{35}$ was hydrogen-treated at 1000° F. for five hours after using for butane combustion (Example 106) and carbon monoxide combustion (Example 109). It was then tested for propane dehydrogenation at 1000° F., 6000 VHSV (3.76 LHSV), 4:1 helium:propane mole ratio, and one atmosphere. At 43 minutes on stream, conversion was 7.69%, all to propylene.

EXAMPLE 70

A 1 ml. sample of $Co_2CoW_{12}O_{37}$ which had been used for hexane conversion at 1000° F. was purged with helium for 30 minutes and tested for propane dehydrogenation at 1000° F., 600 VHSV, 4:1 hydrogen:propane mole ratio. Conversion to propylene was 4.2%.

EXAMPLE 71

The multimetalite $CoCrMo_6O_{19}$ of Example 54 was used without further treatment for dehydrogenation of propane by changing the feed from cyclohexane to propane at $4H_2/C_3H_8$, 3000 VHSV (2.2 LHSV), 1000° F. Conversion was 10.3% all to propylene.

EXAMPLE 77

A fresh 0.2 ml. sample of the chromia alumina such as used for Example 59 was treated with hydrogen for 4 hours and then tested for n-hexane conversion under conditions of Examples 75–76 except that helium was substituted for hydrogen in the experiment. Conversion was 4% at 27% selectivity. This was done to eliminate possible effect of $H_2$ partial pressure on conversion and selectivity.

The following catalysts previously used for cyclohexane dehydrogenation wer then used for n-hexane conversion under conditions of Example 71.

| Example | Catalyst | From Example No.— |
|---|---|---|
| 78 | $CoCoMo_6O_{19}$ | 57 |
| 79 | $Co_2NiMo_9O_{28}$ | 59 |
| 80 | $CoCrMo_6O_{19}$ | 54 |
| 81 | $Pd_3CoW_{12}O_{35}$ | 50 |
| 82 | $CoO/MoO_3/Al_2O_3$ | 62 |
| 83 | $MoO_3/Al_2O_3$ | 63 |
| 84 | $CoCoMo_6O_{19}/Al_2O_3$ (equal weights) | 65 |
| 85 | $CoCoMo_6O_{19}/Al_2O_3$ (20/80 weight) | 66 |
| 86 | $CoCoMo_6O_{19}/SiO_2$(50/50) | 68 |
| 87 | $CoCoMo_6O_{19}/46AlSiO_2/Al_2O_3$(50/50) | 67 |

Table 6 summarizes the results of Examples 75–87.

TABLE 6

| Example | Catalyst | Weight percent Conversion | Weight percent Benzene | Selectivity | Specific activity, $\mu M./sec.$ [a] Per gram | Specific activity, $\mu M./sec.$ [a] per m.[2] |
|---|---|---|---|---|---|---|
| 75 | $Pt/Al_2O_3$ [b] | 54.2 | 34.1 | 61.7 | 12.89 | 0.028 |
| 76 | $Cr_2O_3/Al_2O_3$ [b] | 11.9 | 10.6 | 89.1 | 4.01 | 0.600 |
| 77 | $Cr_2O_3/Al_2O_3$ [b] | 14.9 | 4.0 | 26.8 | 1.51 | 0.023 |
| 78 | $CoCoMo_6O_{19}$ | 34.0 | 20.6 | 60.6 | 7.79 | 0.324 |
| 79 | $Co_2NiMo_9O_{28}$ | 43.7 | 18.7 | 42.8 | 7.07 | 0.295 |
| 80 | $CoCrMo_6O_{19}$ | 10.5 | 5.0 | 47.6 | 1.89 | 0.079 |
| 81 | $Pd_3CoW_{12}O_{35}$ | 5.6 | 3.5 | 62.5 | 1.32 | 0.055 |
| 82 | $CoO/MoO_3/Al_2O_3$ [b] | 16.2 | 7.6 | 53 | 2.87 | 0.018 |
| 83 | $MoO_3/Al_2O_3$ [b] | 7.4 | 3.3 | 44.6 | 1.13 | 0.0084 |
| 84 | $CoCoMo_6O_{19}/Al_2O_3$ [c](1/1) | 32.5 | 19.6 | 60.3 | 7.41 | 0.309 |
| 85 | $CoCoMo_6O_{19}/Al_2O_3$ [c](1/4) | 78.9 | 39.0 | 49.4 | 18.68 | 0.778 |
| 86 | $CoCoMo_6O_{19}/SiO_2$ [c](1/1) | 51.5 | 27.5 | 53.4 | 10.44 | 0.435 |
| 87 | $CoCoMo_6O_{19}/SiO_2/Al_2O_3$(1/1) [c] | 18.8 | 7.8 | 41.5 | 2.95 | 0.122 |

[a] Specific activity—micromoles benzene per second per unit weight (g.) or surface area (square meter) of catalyst. In the multimetalite blends (84–87) only the multimetalite was considered.
[b] Commercial catalysts for dehydrogenation processes.
[c] Aging rate retarded by blends.

EXAMPLE 72

The catalyst $CoAlMo_6O_{19}$ from Example 55 was used according to the procedure of Example 71. Conversion to propylene was 2.5% with 6% selectivity.

EXAMPLE 73

The catalyst $Co_2Co_2Mo_{10}O_{33}$ from Example 56 was used according to the procedure of Example 71. Conversion to propylene was 3.9% with 12.2% selectivity.

EXAMPLE 74

A 0.2 aliquot of $CoCrMo_6O_{19}$ was treated with hydrogen for 4 hours at 1000° F. It was then tested for propane dehydrogenation using helium as diluent in place of hydrogen. Conversion to propylene at 13 minutes was 17.8% with 42% selectivity.

EXAMPLE 75

The catalyst (0.6% Pt on $\eta$-$Al_2O_3$) from Example 61 was tested for normal hexane conversion without further pretreatment by changing the charge stream to hexane-saturated hydrogen under the following conditions: 3.25 LHSV, 1000° F., 4:1 $H_2$:$nC_6H_{14}$, and 1 atmosphere. Maximum yield of benzene was 34.1 wt. percent at 61.7% selectivity.

EXAMPLE 76

The commercial chromia alumina of Example 60 was tested for n-hexane conversion as in Example 75. Maximum benzene yield was 10.6 wt. percent at 89.1% selectivity.

Table 6 demonstrates that multimetalites effectively catalyze the dehydrocyclization of normal hexane and that the activity of mixtures of multimetalites with acidic oxides such as silica, alumina, and silica/alumina is enhanced.

EXAMPLE 88

A 0.2 ml. aliquot of $CoCoMo_6O_{19}$ of the same batch as that used in Example 57 was treated with hydrogen and tested for normal hexane conversion (without having first been used for cyclohexane dehydrogenation). At five minutes-on-stream, benzene yield was 20.6 wt. percent at 60.6% selectivity indicating that the sample of Example 57 had not been adversely affected during the cyclohexane run.

EXAMPLE 89

A 0.2 ml. aliquot of $CoCoMo_6O_{19}$ of a different batch from that used in Examples 57 and 62 was tested as in Example 57. At five minutes the benzene yield from n-hexane was 21.8% with 74% selectivity, indicating a reasonably good reproducibility of activity of the multimetalite from batch to batch.

EXAMPLE 90

A 0.2 ml. aliquot of $CoCoMo_6O_{19}$ of the same batch used in Example 89 was hydrogen-treated and tested for normal hexane conversion under the same conditions except that helium was used as the n-hexane carrier. At five minutes, benzene yield was 4.7 wt. percent at 64% selectivity. At thirty-four minutes, yield was only 0.1%.

EXAMPLES 91-92

Aliquots of $CoCoMo_6O_{19}$ were treated with hydrogen and tested for hexane conversion except that the hydrogen to hydrocarbon ratio was varied by reducing the flow of hexane-saturated hydrogen and introducing sufficient dry hydrogen in a side stream to maintain the original overall vapor hourly space velocity. Results are shown in Table 7.

TABLE 7

| | | Benzene yield, wt. percent (conversion) | |
|---|---|---|---|
| Example | $H_2:nC_6H_{14}$ | Time at next benzene yield Maximum | At $t_{max}.+60$ min. |
| 90 | *0 | 5 minutes  4.7 (7.3) | <0.1 (2) |
| 89 | 4 | do  21.8 (29.3) | 4 (8) |
| 91 | 5.25 | 20 minutes  19.9 (52.4) | 7.4 (15.9) |
| 92 | 9.0 | 86 minutes  23.0 (79.5) | 12.0 (23.5) |

*4:1 He:n-$C_6H_4$.

Table 7 indicates that beneficial effects are obtained by using hydrogen as a diluent.

EXAMPLES 93-94

The procedure of Examples 91 and 92 was repeated but using water-saturated hydrogen in place of the dry hydrogen as stream diluents. Results are shown in Table 8.

TABLE 8

| | | | $t_{max}$. for benzene yield, min. | Benzene yield, weight percent (conversion) | |
|---|---|---|---|---|---|
| Example | Wet or dry | $H_2/nC_6$ | | Maximum | At $t_{max}.+60$ min. |
| 91 | Dry | 5.25 | 20 | 19.9 (52.4) | 7.4 (15.9) |
| 93 | Wet (5.8 mm.) | 5.20 | 15 | 25.6 (68) | 8.0 (15.3) |
| 92 | Dry | 9.0 | 86 | 23.0 (79.5) | 12.0 (23.5) |
| 94 | Wet (13.5 mm.) | 8.63 | 40 | 21.9 (69.2) | 7.0 (12.9) |

Results show that certain levels of water in the charge may have beneficial effects.

Examples 95-99 are concerned with isomerization/dehydrogenation of methylcyclopentane. Results are shown in Table 9.

EXAMPLE 95

The 0.2 ml. $CoCoMo_6O_{19}$ used for Example 78 was treated with hydrogen for four hours at 1000° F. It was then tested for conversion of methylcyclopentane at 1000° F., 12,000 VHSV (2.79 LHSV), 4:1 $H_2$:MCP mole ratio, 1 atmosphere. Periodic effluent samples were analyzed by vapor phase chromatography.

EXAMPLE 96

The $CoCoMo_6O_{19}$/commercial chi alumina catalyst from Examples 65 and 84 was purged with hydrogen for ten minutes (while changing feed stock) and tested for methylcyclopentane conversion as in Example 95.

EXAMPLE 97

The catalyst $CoCoMo_6O_{19}$/commercial chi alumina from Examples 66 and 85 was purged with hydrogen and tested for methylcyclopentane conversion as in Example 95.

EXAMPLE 98

The $CoCoMo_6O_{19}/SiO_2/Al_2O_3$ catalyst from Examples 67 and 87 was purged with hydrogen for ten minutes and tested for methylcyclopentane conversion as in Example 95.

EXAMPLE 99

The $CoCoMo_6O_{19}/SiO_2$ catalyst from Example 86 was purged with hydrogen for ten minutes and then tested for methylcyclopentane conversion as in Example 95.

TABLE 9

| Example | Catalyst | A, conv. | Cracked | Hexanes | Unsat. naphthenes | B, benzene | Selectivity A/B, percent |
|---|---|---|---|---|---|---|---|
| 95 | $CoCoMo_6O_{19}$ | 10.3 | 5.4 | 3.6 | 0.1 | 1.3 | 12.6 |
| 96 | $CoCoMo_6O_{19}/Al_2O_3$ (1:1) | 16.2 | 6.1 | 0.8 | 4.8 | 4.5 | 27.8 |
| 97 | $CoCoMo_6O_{19}/Al_2O_3$ (1:4) | 54.6 | 19.7 | | 2.0 | 32.9 | 60.3 |
| 98 | $CoCoMo_6O_{19}/SiO_2/Al_2O_3$ (1:1) | 9.9 | 3.9 | T | 0.5 | 5.5 | 55.5 |
| 99 | $CoCoMo_6O_{19}/SiO_2$ | 11.5 | 6.0 | T | 1.2 | 4.3 | 37.4 |

Above data demonstrates that a good dual functional catalyst can be prepared by combining the hydrogenation-dehydrogenation function of the multimetalite with the acid function of $Al_2O_3$.

Examples 100-104 deal with hydrocracking of n-hexane. Results are shown in Table 10.

EXAMPLE 100

A 0.2 ml. aliquot of $CoCoMo_6O_{19}$ was hydrogen treated and tested for hexane conversion under conditions of Example 75 using 1000° F. and the same vapor hourly space velocity but substituting pure hydrogen for half of the $H_2$/n-$C_6H_{14}$ (new $H_2$:n-$C_6H_{14}$=9:1).

EXAMPLE 101

A 0.2 ml. aliquot of $CoCoMo_6O_{19}$ was tested for hexane conversion under conditions of Example 100 but using a $H_2$:n-$C_6H_{14}$ mole ratio of 5.25:1.

EXAMPLE 102

A 0.2 ml. aliquot of $CoCoMo_6O_{19}$ was tested as in Example 100 but using a $H_2$:n-$C_6H_{14}$ ratio of 24.

EXAMPLE 103

A 0.2 ml. aliquot of $CoCoMo_6O_{19}$ was tested as in Example 92 but using water-saturated hydrogen in place of the dry hydrogen ($H_2$:n-$C_6H_{14}$=8.63:1).

EXAMPLE 104

A 0.2 ml. aliquot of $CoCoMo_6O_{19}$ was tested as in Example 93 but using water-saturated hydrogen ($H_2$:n-$C_6H_{14}$=5.21)

TABLE 10

| Example | $H_2$:n-$C_6H_{14}$ | Wet/dry | Time on stream minutes | Wt. percent $CH_4$ in hydrocarbon effluent |
|---|---|---|---|---|
| 100 | 9:1 | Dry | 0-70 | 100 |
| | | | 80 | 98.4 |
| | | | 83 | 93.3 |
| 101 | 5.25:1 | Dry | 0-15 | 100 |
| | | | 20 | 32.5 |
| 102 | 24:1 | do | 0-240 | 100 |
| 103 | 8.63:1 | Wet | 0-90 | 100 |
| | | | 100 | 94.5 |
| 104 | 5.2:1 | do | 0-10 | 100 |
| | | | 15 | 42.4 |

Above data show that multimetalites are suitable catalysts for hydrocracking and could be useful in the manufacture of city gas where a high hydrogen partial pressure is maintained.

Examples 105-107 deal with combustion of hydrocarbons. Results are shown in Table 11.

EXAMPLE 105

The $Co_2CoW_{12}O_{37}$ prepared as in Example 44 was hydrogen treated at 1000° F. and tested for combustion of n-butane at 12,000 VHSV, 49:1 air:$C_4H_{10}$ ratio, and atmospheric pressure at 623-940° F.

EXAMPLE 106

A 0.1 ml. sample of $Pt_3CoW_{12}O_{35}$ of same lot as that used in Example 47 was treated with hydrogen for 4 hours at 800° F. and tested for n-butane combustion as in Example 105 but at 30,000 VHSV.

EXAMPLE 107

A 0.25 ml. aliquot of commercial combustion catalyst $CuO/V_2O_5/Pd/Al_2O_3$ was tested for n-butane combustion under conditions of Example 105.

TABLE 11

| Example | Catalyst | ° F. | Percent n-$C_4H_{10}$ converted to $CO_2$ |
|---|---|---|---|
| 105 | $Co_2CoW_{12}O_{37}$ | 623 | 5.0 |
| | | 708 | 26.6 |
| | | 756 | 39.1 |
| | | 815 | 44.9 |
| | | 877 | 48.8 |
| 106 | $Pt_3CoW_{12}O_{35}$ | 250 | 0.68 |
| | | 304 | 2.9 |
| | | 382 | 18.9 |
| | | 411 | 89.1 |
| | | 453 | 95 |
| | | 525 | 99.5 |
| 107 | $CuO/V_2O_5/Pd/Al_2O_3$ | 448 | 0.3 |
| | | 590 | 4.1 |
| | | 660 | 11.5 |
| | | 704 | 17.6 |
| | | 770 | 32.6 |
| | | 843 | 56.9 |

Table 11 indicates that $Co_2CoW_{12}O_{37}$ is better than the commercial catalyst below 800° F. and not as good above 800° F. The $Pt_3CoW_{12}O_{35}$ is superior to both, even at 2½ times the vapor hourly space velocity.

Examples 108–110 deal with the combustion of carbon monoxide. Results are shown in Table 12.

EXAMPLE 108

The $Co_2CoW_{12}O_{37}$ of Example 105 was used without further pretreat to burn carbon monoxide at 12,000 VSHV, 49:1 air:CO ratio, 1 atmosphere, at 343–860° F.

EXAMPLE 109

The $Pt_3CoW_{12}O_{35}$ of Example 106 was purged with hydrogen for 3 hours at 800° F. and tested for carbon monoxide combustion as in Example 108 but at 31,700 VHSV, 18:1 air:CO ratio, 223–525° F.

EXAMPLE 110

A 0.25 ml. aliquot of the same $CuO/V_2O_5/Pd/Al_2O_3$ commercial combustion catalyst as used in Example 107 was purged with helium for thirty minutes at 1000° F. and tested for carbon monoxide combustion under the conditions used in Example 108.

TABLE 12
Carbon monoxide combustion

| Example | Catalyst | ° F. | Percent combustion |
|---|---|---|---|
| 108 | $Co_2CoW_{12}O_{37}$ | 500 | 1 |
| | | 632 | 5.7 |
| | | 677 | [1] 36.4 |
| | | 710 | [1] 40.9 |
| | | 770 | [1] 47.9 |
| | | 800 | 100 |
| 109 | $Pt_3CoW_{12}O_{35}$ | 270 | 1.2 |
| | | 338 | 10.2 |
| | | 382 | 18.9 |
| | | 411 | 89.1 |
| | | 453 | 95.0 |
| | | 528 | 99.5 |
| 110 | $CuO/V_2O_5/Pd/Al_2O_3$ | 250 | 3.1 |
| | | 310 | 4.6 |
| | | 390 | 11.2 |
| | | 454 | 32 |
| | | 492 | 65.1 |
| | | 500 | 67.1 |
| | | 557 | 92.2 |
| | | 667 | 95.3 |
| | | 780 | 100 |

[1] Some aging.

Table 12 shows that the $Pt_3CoW_{12}O_{35}$ catalyst is the best of the above three.

EXAMPLE 111

A 0.1 ml. aliquot of the $Pt_3CoW_{12}O_{35}$ from Example 47 was treated with hydrogen for four hours. It was then tested for nitric oxide decomposition in a microunit set up for pulse operation. [The reactor was in the chromatographic system, ahead of a silica gel column (−78° C.) with helium carrier flowing at 100 ml./minute and periodic injection—via sample loop—of 2.3 ml. of Matheson research grade nitric oxide. Net reaction: $2NO \rightarrow N_2 + O_2$.] Flow rate was equivalent to 60,000 VHSV (0.06 second overall contact time). Testing was done in a rising temperature sequence from 415–1080° F. Conversion was less than 1% below 600° F., rose to a maximum at 840–900° F., and declined rapidly above 1000° F.

Catalyst was cooled to 725° revealing aging at above 1000° F. was quite severe. After a four hour air regeneration, activity was partially restored. Results are summarized in Table 13.

TABLE 13

| Catalyst treat | ° F. | Wt. percent decomposition |
|---|---|---|
| 4 hours $H_2$ | 415–600 | <1 |
| | 725 | 6.3 |
| | 755 | 10.5 |
| | 840 | 41.4 |
| | 918 | 40.9 |
| | 1,005 | 25.0 |
| | 1,015 | 11.4 |
| None | 1,080 | 4.3 |
| | | 5.2 |
| | 725 | 2.6 |
| | | 1.0 |
| 4 hours air | 870 | 9.4 |

EXAMPLE 112

A 0.1 ml. aliquot of $Co_2CoW_{12}O_{37}$ of the lot used in Example 44 was purged with helium for 260 minutes and tested for nitric oxide decomposition as in Example 111 above but at 48,000 VHSV and 260–1120° F.

It was treated with air for five hours and retested for nitric oxide decomposition at 520–1100° F.

The catalyst was then treated with hydrogen for five hours and retested for nitric oxide decomposition but at 72,000 VHSV (0.05 second) and at 730–945° F. Results are summarized in Table 14.

TABLE 14

| Catalyst treat | VHSV | ° F. | Wt. percent NO composition |
|---|---|---|---|
| Helium | 48,000 | 260–1,000 | 0 |
| | | 1,120 | 0.6 |
| Air | 48,000 | 520–1,100 | <0.5 |
| | | 730 | 0.5 |
| | | 810 | 4.9 |
| Hydrogen | 72,000 | 855 | 25.1 |
| | | 935 | 23.0 |
| | | 945 | 2.7 |

Pretreating conditions are not necessarily optimum as is obvious from results in Examples 107 and 108. It is apparent that these conditions vary greatly from catalyst to catalyst.

EXAMPLE 113

A 1.25 g. aliquot of the sample prepared for Example 43 was charged to the microunit (sufficient to contain 0.2 ml. or 200 mg. of $H_xCoMo_6O_{19}$). The catalyst was treated for four hours at 1000° F. with flowing hydrogen before testing for hexane conversion at 1000° F., 4:1 $H_2/nC_6$, 3.24 LHSV with respect to $H_xCoMo_6O_{19}$ (0.49 overall LHSV). Periodic samples of the effluent were analyzed by VPC.

After 20½ hours on stream, the catalyst was regenerated in air flowing at 50 ml. per minute, treated with hydrogen for 2½ hours and retested. After one hour on stream, the charge flow rate was doubled. A second regeneration followed after 20 hours on stream. The catalyst received a 2½ hour hydrogen treated before resuming testing. Results are shown in Table 15.

TABLE 15

Hexane conversion at 1,000° F., 4:1 H₂:nC₆

| LHSV | Time on stream | A, conversion[1] | B, aromatics[2] | Selectivity, B/A |
|---|---|---|---|---|
| 3.24 | 5 | 98.8 | 30.1 | 30 |
|  | 20 | 95.2 | 31.9 | 34 |
|  | 61 | 98.7 | 36.4 | 37 |
|  | 120 | 96.2 | 33 | 34 |
|  | 1,200 | 33.5 | 13.6 | 41 |
| A. (Regenerated): |  |  |  |  |
| 3.24 | 5 | 100 | 31.5 | 31.5 |
|  | 21 | 97 | 31.3 | 32 |
|  | 60 | 97 | 31.9 | 33 |
| 6.48 | 67 | 67.2 | 24 | 36 |
|  | 120 | 59.6 | 32.7 | 55 |
|  | 1,200 | 13 | 8.5 | 66 |
| B. (Regenerated) |  |  |  |  |
| 6.48 | 10 | 93 | 31.8 | 34.1 |
|  | 64 | 67.5 | 32.6 | 48 |

[1] Cracked products: Aged catalyst (20 hrs.) 56.6% CH₄, 1.1% C₂H₆, 42.4% C₃H₈. Regen. catalyst (1½ hrs. on stream) 39.9% CH₄, 2.6% C₂H₆, 57.5% C₃H₈. (Unsupported multimetalite) 100% CH₄.
[2] 52–80% benzene, 48–20% toluene and ethylbenzene.

Cracked product distribution show more useful products are derived by using the supported multimetallite catalyst.

We claim:

1. A catalyst having the formula $$M_{m/n}M'_xM''_yO_w$$

wherein the formula is represented by a member selected from the group consisting of (1) $$CoM'_xMo_6O_{19}$$

and M' is a metal selected from the group consisting of cobalt, iron, chromium and aluminum and x is 1;

(2) $$Co_2M'_xMo_yO_w$$

and M'ₓ is selected from the group consisting of Co₂ wherein y is 10 and w is 33 and Ni wherein y is 10 and w is 28';

(3) $$CrM'_xMo_yO_{19}$$

and M' is a metal selected from the group consisting of chromium wherein y is 9 and cobalt wherein y is 6; and x is 1;

(4) $$Pt_3M'_xMo_yO_w$$

and M' is a metal selected from the group consisting of cobalt wherein x is 2, y is 10 and w is 21 and nickel wherein x is 1, y is 9 and w is 19; and (5) $$M_{m/n}Co_xW_{12}O_w$$

and $M_{m/n}$ is selected from the group consisting of Pt₃, Pd₃ and Cu₃ wherein w is 35, Co₂ and Cr₂ wherein w is 37 and Ni₃ wherein w is 38; and x is 1.

2. The catalyst of claim 1 wherein the formula is $$CoM'_xMo_6O_{19}$$

wherein M' is a metal selected from the group consisting of cobalt, iron, chromium and aluminum and x is 1.

3. The catalyst of claim 1 wherein the formula is $$Co_2M'_xMo_yO_w$$

wherein M'ₓ is selected from the group consisting of Co₂ wherein 4 is 10 and w is 33 and Ni wherein y is 10 and w is 28.

4. The catalyst of claim 1 wherein the formula is $$CrM'_xMo_yO_{19}$$

wherein M' is a metal selected from the group consisting of chromium wherein y is 9 and cobalt wherein y is 6; and x is 1.

5. The catalyst of claim 1 wherein the formula is $$Pt_3M'_xMo_yO_w$$

wherein M' is a metal selected from the group consisting of cobalt wherein x is 2, y is 10 and w is 21 and nickel wherein x is 1, y is 9 and w is 19.

6. The catalyst of claim 1 wherein the formula is $$M_{m/n}Co_xW_{12}O_w$$

wherein $M_{m/n}$ is selected from the group consisting of Pt₃, Pd₃ and Cu₃ wherein w is 35, Co₂ and Cr₂ wherein w is 37 and Ni₃ wherein w is 38; and x is 1.

References Cited

UNITED STATES PATENTS

| 3,518,208 | 6/1970 | Schneider | 252—468 |
| 3,475,344 | 10/1969 | Adam | 252—432 |
| 3,464,931 | 9/1969 | Aglietti | 252—470 |
| 3,194,771 | 7/1965 | Vassrur | 252—470 |
| 3,502,506 | 3/1970 | Broydr | 136—86 |
| 3,312,635 | 4/1967 | Liquori | 252—470 |
| 3,415,760 | 12/1968 | Hadley | 252—470 |
| 3,522,299 | 7/1970 | Takenaka | 260—533 |
| 3,317,439 | 5/1967 | Styles | 252—455 |
| 3,513,109 | 5/1970 | Styles | 252—462 |
| 3,155,627 | 11/1964 | Cole | 252—477 |

DANIEL E. WYMAN, Primary Examiner

W. J. SHINE, Assistant Examiner

U.S. Cl. X.R.

252—466 J, 470

UNITED STATES PATENT OFFICE
CERTIFICATE OF CORRECTION

Patent No. 3,752,776      Dated August 14, 1973

Inventor(s) A.W.Chester, G.T.Kerr, H.S.Sherry and A.E.Schweizer

It is certified that error appears in the above-identified patent and that said Letters Patent are hereby corrected as shown below:

| | |
|---|---|
| Column 4, line 7 | "350" should be --800-- <br> "1250°F." should be --1200°F.-- |
| Column 7, line 49, first column in Table 1, seventh compound | "$[Pt(NH_3)_4]_3[Co_3Mo_{10}O_{36}] \cdot 11H_2O$" should be <br> --$[Pt(NH_3)_4]_3[Co_2Mo_{10}O_{36}] \cdot 11H_2O$-- |
| Column 10, last column in Table 2, Ex. 51, 14th line | "52-55" should be --52-56-- |
| Column 11, second column Table 3, Ex. 62 | "$CoO/Mo-3/Al_2O_3$" should be --$CoO/MoO_3/Al_2O_3$-- |
| Column 11, line 41 | "6.75" should be --6.76-- |
| Column 12, sixth column, Table 5, Ex. 65 | "1.3" should be --91.3-- |
| Column 13, line 67 | "3.25" should be --3.24-- |
| Column 14, line 11 | "wer" should be --were-- |
| Column 14, last column, Table 6, Ex. 76 | "0.600" should be --0.060-- |
| Column 16, last column heading, Table 9 | "A/B" should be --B/A-- |

UNITED STATES PATENT OFFICE
CERTIFICATE OF CORRECTION

Patent No. 3,752,776           Dated August 14, 1973

Inventor(s) A.W.Chester, G.T.Kerr, H.S.Sherry and A.E.Schweizer

It is certified that error appears in the above-identified patent and that said Letters Patent are hereby corrected as shown below:

(Page 2)

Column 17, line 35          "VSHV" should be --VHSV--

Column 19, line 17,         "56.6%" should be --56.5%--
 Table 15, first footnote Column 19, line 37,         "28'" should be --28--
 Claim 1

Column 20, line 10          "4" should be --y--
 Claim 3

Signed and sealed this 5th day of March 1974.

(SEAL)
Attest:

EDWARD M.FLETCHER,JR.          C. MARSHALL DANN
Attesting Officer              Commissioner of Patents